Dec. 8, 1931.  E. N. JACOBI  1,835,780
SWITCH
Filed May 13, 1927  3 Sheets-Sheet 1

Edward N. Jacobi
By Ira Milton Jones
Attorney

Dec. 8, 1931.  E. N. JACOBI  1,835,780
SWITCH
Filed May 13, 1927   3 Sheets-Sheet 2
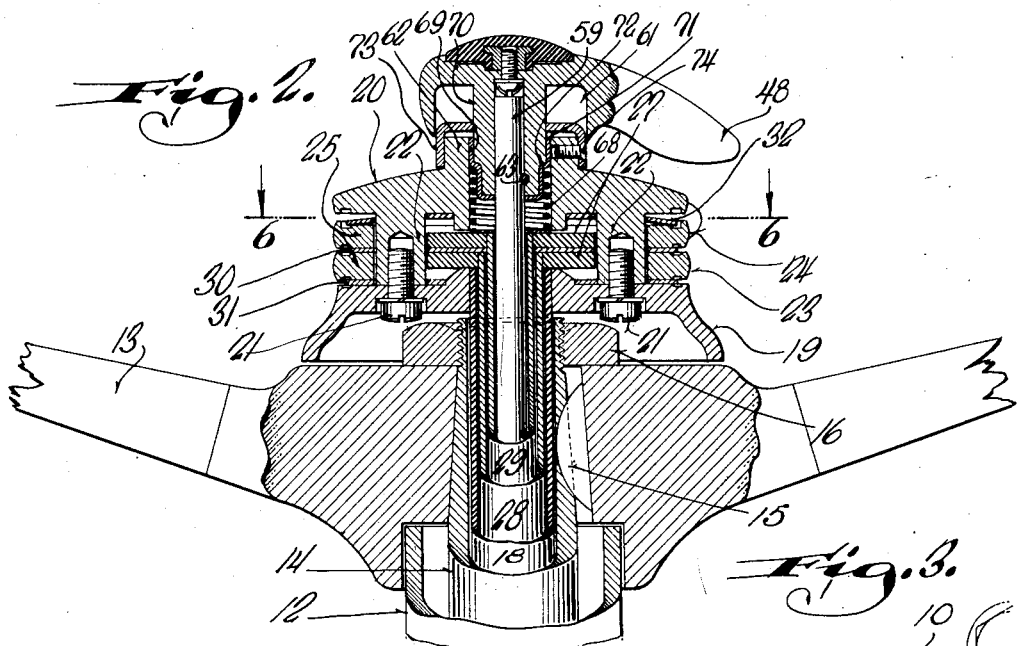
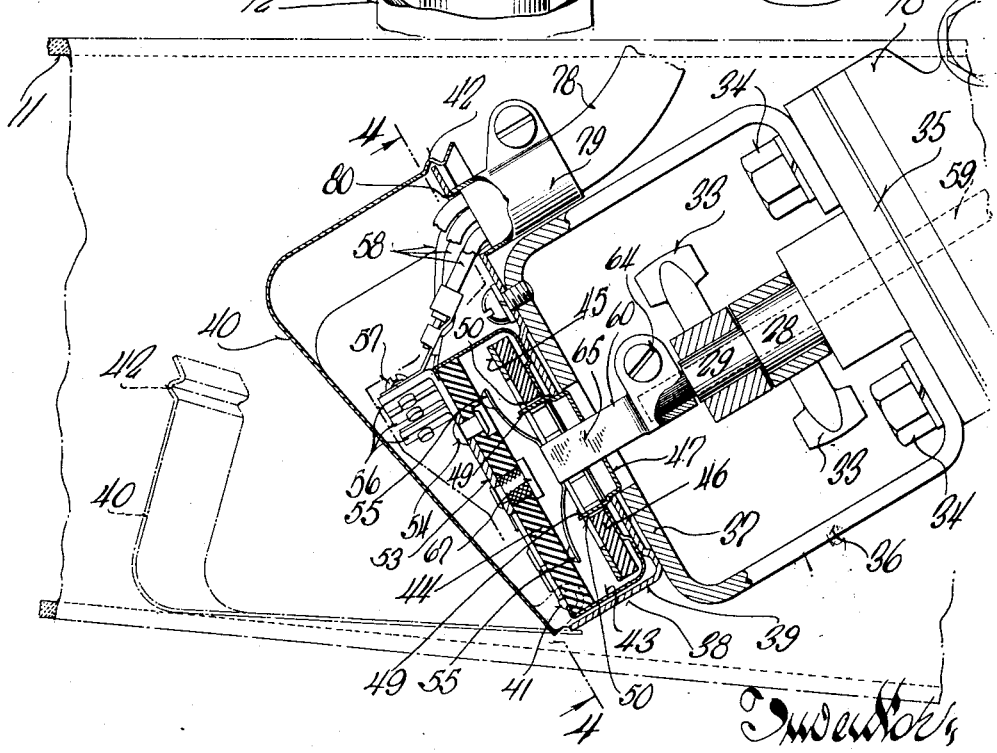
Inventor,
Edward N. Jacobi
By Ira Milton Jones
Attorney

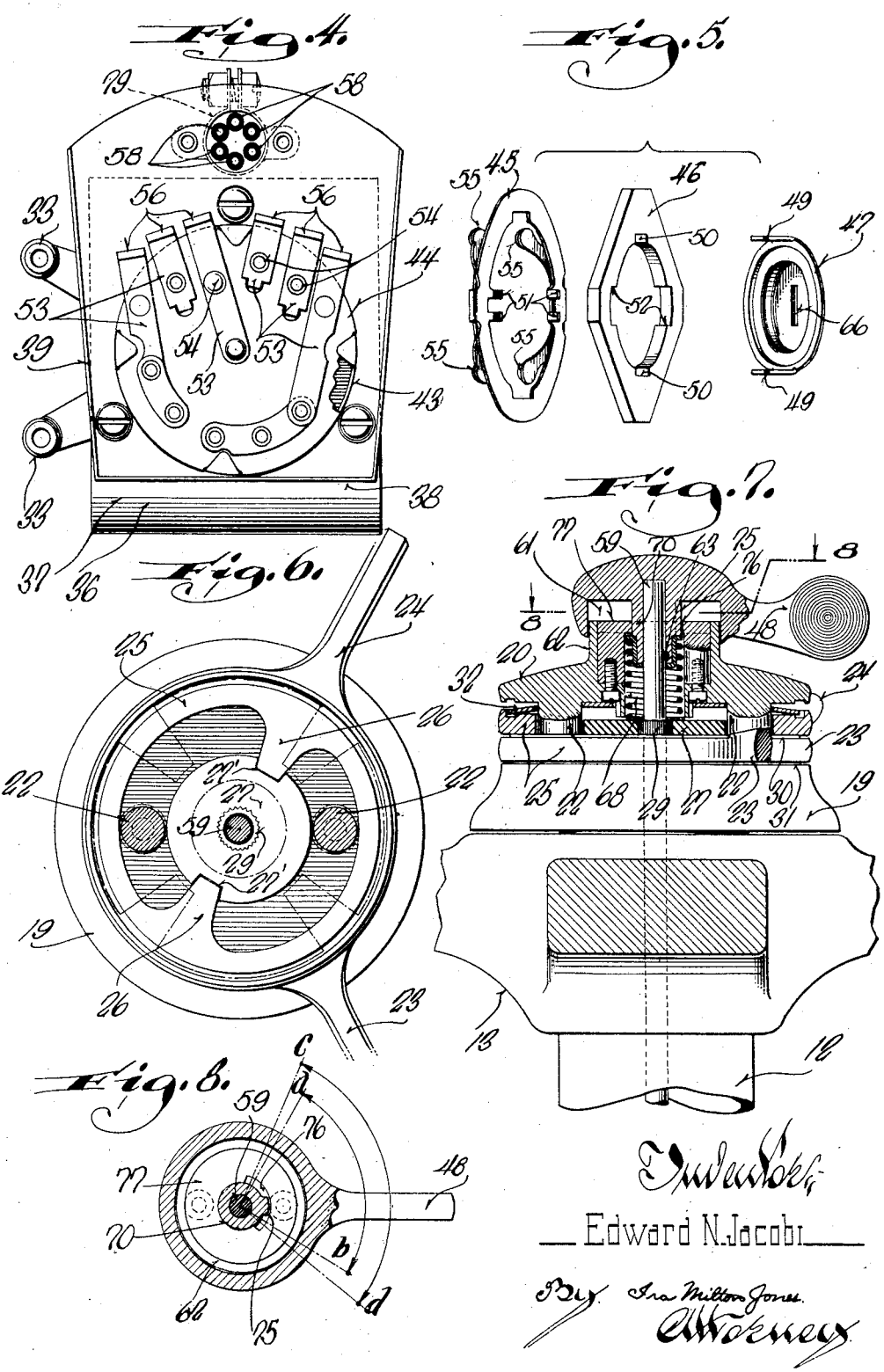

Patented Dec. 8, 1931

1,835,780

UNITED STATES PATENT OFFICE

EDWARD N. JACOBI, OF MILWAUKEE, WISCONSIN, ASSIGNOR TO BRIGGS & STRATTON CORPORATION, OF MILWAUKEE, WISCONSIN, A CORPORATION OF WISCONSIN

SWITCH

Application filed May 13, 1927. Serial No. 191,080.

Heretofore, automobile switches have been mounted on the instrument dash or panel board, which is objectionable in that difficulty is experienced in installing the switch due to the fact that the mechanic must work blindly from below the panel board and further the complicated arrangement of wires running to the switch not only increases service costs, but adds materially to the installation and material costs.

With the above and other objectionable features in mind, this invention contemplates as one of its objects the provision of an improved switch of the character described which is mounted on the steering gear and within the hood and which is entirely controlled from operating means mounted at the upper end of the steering column.

Another object of this invention resides in the provision of an improved switch having operating means mounted at the upper end of the steering column and so arranged that the rotation actuates the switch proper and the depression thereof closes a horn circuit.

It is a further object of this invention to provide an improved switch of the character described which is so located as to be capable of ready access for the purpose of installation or service and to materially reduce the amount of wire necessary for its installation.

And a still further object of this invention resides in the provision of improved means for conducting the wires into the switch casing at substantially the same plane as the switch terminals to facilitate the connection of the wires with their respective terminals and reduce the probability of their becoming disconnected.

With the above and other objects in view, which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated several complete examples of the physical embodiment of my invention constructed according to the best modes I have so far devised for the practical application of the principles thereof, and in which;

Figure 2 is a view, partly in section and partly in elevation, taken transversely through the upper end of a steering gear illustrating my improved switch control with the mounting of the steering wheel and throttle and spark levers;

Figure 3 is a side view, partly in elevation and partly in section, of the lower portion of a steering gear illustrating the manner of mounting my improved switch unit thereon;

Figure 4 is a view looking at the switch unit on the plane of the line 4—4 of Figure 3, the movable cover thereof being detached and part of the terminal mounting head being broken away;

Figure 5 is a perspective view of the contact assembly with the parts thereof separated;

Figure 6 is a view, partly in section and partly in elevation, taken through Figure 2 on the plane of the line 6—6;

Figure 7 is a view similar to Figure 2 illustrating a slightly modified construction designed for use in connection with a steering gear assembly wherein the switch and horn actuating rod member is of reduced diameter, and Figure 8 is a view taken through Figure 7 on the plane of the line 8—8 to illustrate an improved means for limiting the movement of the switch actuating lever.

Figure 1:
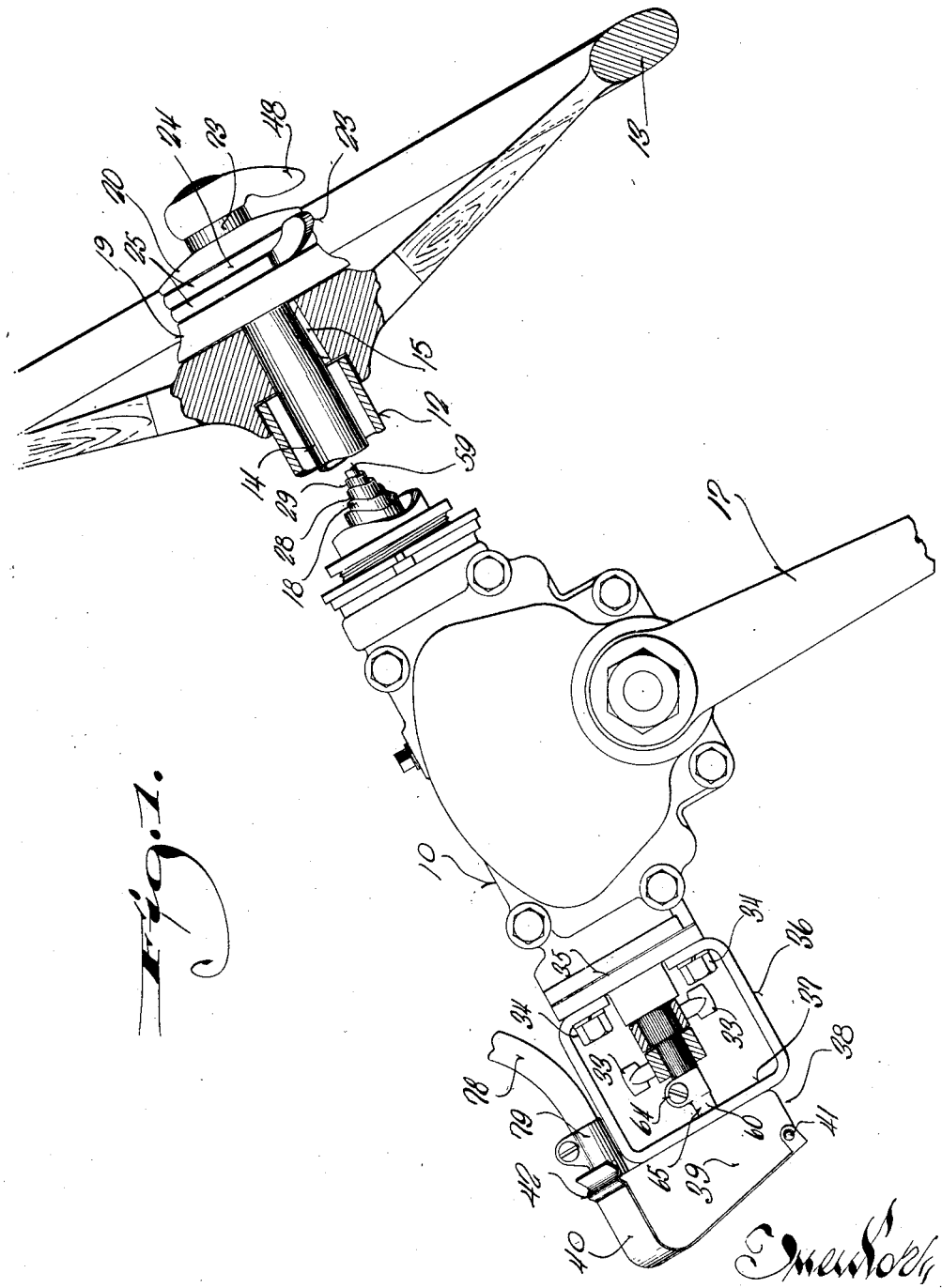
Figure 1 is a side view, partly in section and partly in elevation, of an automotive vehicle steering gear equipped with one of my improved switches, the medial portion of the steering column not being shown.

Referring now more particularly to the accompanying drawings, in which like numerals designate like parts throughout the several views, 10 designates the gear housing or casing of a steering gear adapted to be suitably mounted from the adjacent chassis frame side beam 11 of the vehicle in a conventional manner. A stationary column 12 is secured to the housing and extends upwardly to a point adjacent the driver's seat and has a steering tube 14 concealed therein with its lower end, not shown, connected with the gearing in the housing 10. The upper end of the steering tube is tapered and extends above the column to receive a steering wheel 13 which is fixed thereto by a key 15 and a jam nut 16. As is customary in steering gear constructions, a drag link or pitman arm 17 is operated from the gearing within the housing and is connected with the vehicle steering wheels, not shown.

Mounted within the steering tube is a stationary escutcheon supporting tube 18, the lower end of which, not shown, is fixed with respect to the housing and the upper end of which projects above the steering tube and wheel to receive an escutcheon or base 19 of preferably an ornamental exterior and covering the nut 16 and hub portion of the steering wheel. An escutcheon top or cap 20 is spaced above the base 19 by cap screws or the like 21 passed through the top of the escutcheon 19 and threaded into studs or projections 22 integral with the cap, the studs forming stops and guides for the spark and gas control levers 23 and 24.

The inner ends of the levers 23 and 24 are flanged and of a shape approximately corresponding with the diameter of the escutcheon 19, as at 25, to fit between the escutcheon 19 and cap 20 and be frictionally held against rotation, in the manner later described. The exterior diameters of the flanges 25 correspond with the diameter of the cap 20 for appearances sake and the flanges are each centrally bored a diameter slightly greater than the distance between the outermost surfaces of the studs 22. Projected inwardly from diametrically opposed points of each annular flange are two driving lugs or keys 26 adapted to engage in notches or recesses 27' in collars or flanges 27 suitably fixed on the upper ends of control tubes 28 and 29, later described.

One control tube is connected with the annular flange or ring of lever 23 and the other control tube 29 is mounted on the tube 28 and is connected with the annular flange or ring of lever 24, the collars or flanges 27 being secured to the upper ends of the respective control tubes by pressing the same thereon, or in any other suitable manner. A sheet or layer of friction material 30 is disposed between the annular flanges or rings 25 and the collars or flanges 27 and a sheet or layer of friction material 31 is confined between the top of the escutcheon 19 and the annular flange or ring of the lever 23, the assembly being maintained under tension by a tension member 32 confined between the annular flange or ring 25 of the lever 24 and the cap 20. The tension member 32 maintains a constant pressure on the annular flanges or rings and the friction material 31, as customary in structures of this character. The tubes 28 and 29 have levers 33 fixed to their lower ends for connecting the tubes with the conventional gas and spark control mechanism, not shown.

All of the foregoing is substantially conventional construction and my invention resides more particularly in the mounting of a switch adjacent the steering gear housing and controlling the same from the steering wheel, together with the other features hereinafter described and claimed. The cap or other screws 34 normally securing the plate 35 of the gear housing in place also serve to mount a one piece bracket or supporting strap 36 of rectangular shape and on the outer end 37 of which the switch unit 38 is secured, the switch being in axial alignment with the steering column, as best shown in Figures 1 and 3.

The switch unit consists of a housing 39 having its bottom and one side wall open and adapted to be normally closed by a substantially L-shaped cover 40 which is hinged to the outer edge of the bottom wall, as at 41. The free edge of the cover has an elongated bead or recess 42 formed therein to yieldably engage the edge of the casing bottom and retain the cover closed and the switch is so arranged that its open end facilitates the ready servicing of the switch, as will be later described.

The switch unit proper consists of a retaining cup 43 having its open end closed by a terminal carrying head 44 of insulating material and mounting the various stationary terminals, to be better described. Rotatable between the closed end of the cup and the terminal carrying head is a contact support 45, a fibre contact disc 46 and a driver member 47. The contact support 45, contact disc 46 and driver member 47 are rotatable between the terminal head and the closed end of the cup 39, from a switch lever 48 mounted above the cap 20, as hereinafter described.

The fibre disc 46 is drivingly connected with the member 47 by a pair of tongues or lugs 49 projected therefrom and engaging in recesses or notches 50 in the disc. The contact support 45 is in turn driven from the fibre disc 46 through tongues or lugs 51 projected therefrom and engaging in recesses or notches 52 in the disc 46. In this manner the contact support 45 is drivingly connected with and at the same time insulated from the member 47. The terminal carrying head 44 has a plurality of terminals 53 fixed thereto by means of rivets 54, which extend through the head 44 and form contacts with which spring contact fingers 55 carried by the contact support 45 are selectively engageable. The outer end portions 56 of the terminals 53 are located adjacent the upper opened end of the housing 39 and are bent laterally and carry terminal screws 57 to facilitate the connection therewith of the conductors 58.

The switch is operated from the steering wheel by the lever 48 through the medium of an actuating rod or tube 59 mounted within the tube 29 and having its upper end extended beyond the escutcheon cap 20 and its lower end projected beyond the lower end of the tube 29 to receive an actuator 60, to be described. The lever 48 has its inner end enlarged and under-bored, as at 61, to receive an enlargement or boss 62 on the central portion of the cap 20 and is fixed to the rod 59 by a pin or other means 63. The actuator 60 is clamped or otherwise secured to the lower end of the rod 59, as at 64, and has a tongue or projection 65 extended into a slot 66 in the driver member 47. The tongue 65 projects through the slot 66 beyond the members 45 and 46 to have electrical engagement with a horn contact 67 in electrical connection with one of the terminal members 53.

The rod or tube 59 is normally retracted to disengage its actuator 65 and the horn contact 67 by an expansile spring 68 located within the bore 69 of cap 20 and compressed between the topmost flange 27 and the lower end of a central projection or boss 70 carried by the enlarged portion of the lever 48. Rotation of the rod 59 through its lever 48 rotates the contact carrying member 45 through its connection with the rod and actuates the contact support 45 to make and break the respective circuits in which the contacts 54 are included. Likewise, a depression of the lever 48 against its spring 68 engages the tongue 65 with the horn contact 67 to complete the continuity of its circuit.

The lever 48 is so mounted as to permit its easy depression irrespective of the angle at which pressure is applied and, in the construction illustrated in Figure 2, a bearing cap 71 is fitted over the inner end of the boss 70 and guided in the bore 69. The extreme inner end of the cap 71 is slightly reduced to form a shoulder 72 against which the upper end of the spring engages, and the lever 48 is further guided by a cap 73 fitted over the boss 62 of the cap 20 and there secured by a screw or other means 74, the outside diameter of the cap 73 being of a diameter slightly less than that of the bore 61.

The construction illustrated in Figure 7 is particularly designed for use where the diameters of the tubes 28 and 29 are such that the diameter of the tube or rod 59 is, of necessity, very small and provision is made to prevent the twisting of the rod. A stop 75 is formed on the boss 70 and engages in an arcuate slot 76 in a guide or insert 77 secured in the cap boss 62. As illustrated in Figure 8, the lines *a b* designate the limits of movement of the lever 48 necessary to complete full actuation of the switch in either direction and the lines *c d* represent the additional movement allowed to insure the complete operation of the switch without placing undue strain on the rod 59. In this construction, as well as in that illustrated in Figure 2, the springs 68 cooperate with the tension member 32 to place friction on the gas and spark control levers.

The conductors 58 are preferably led to the switch unit in a single cable 78 and are connected with the switch housing by a clamp 79 fixed thereto in alignment with an opening 80 therein. The entrance of the wires or conductors to the interior of the switch is such that their ends have approximately the same angle as the terminal ends 56 so they are released of all undue strain that tend to break the same. Further, it will be noted that the angle of the terminal ends 56 is such that a mechanic may have ready access thereto with his work well in sight at all times to permit the connection of the conductors with their respective terminals.

From the foregoing description taken in connection with the accompanying drawings, it will be readily apparent to those skilled in the art to which an invention of the character described appertains, that I have provided a novel and improved switch construction which may be applied to all makes of cars and which will eliminate many objectionable features of the present types of switches and which is very practical in construction and materially lowers the production, installation and service costs.

What I claim as my invention is:

1. In a motor vehicle, the combination with the steering gear thereof, of a switch housing mounted upon the lower end portion of the steering gear, switch instrumentalities within the housing, contact terminals arranged at the upper portion of the switch housing, a cover for the switch housing, and means hingedly mounting the cover whereby the same swings downwardly to open position to expose the terminals.

2. A switch mechanism adapted to be mounted at the lower end of the steering column of an automotive vehicle and comprising a substantially cup shaped casing enclosing the mechanism and mounted co-axially with the steering column, a terminal head closing the casing, stationary contacts carried by the terminal head within the casing, terminal members on the exterior of the terminal head and electrically connected with the stationary contacts, and means for attaching conductor wires to the terminal members, said means being disposed side by side at the upper portion of the casing to facilitate attachment and removal of conductor wires therefrom.

3. In a switch mechanism adapted to be mounted at the lower end of the steering column of an automotive vehicle, a substantially cup shaped casing enclosing the mechanism and mounted co-axially with the steering column, a terminal head closing the casing, stationary contacts carried by the terminal head within the casing, terminal members on the exterior of the terminal head and electrically connected with the stationary contacts, means for attaching conductor wires to the terminal members, said means being disposed side by side at the upper portion of the casing to facilitate attachment and removal of conductor wires therefrom, an enclosing housing for the switch mechanism and terminal members, and a cover for the housing adapted when in open position to expose said terminal members and means for attaching conductor wires from the top.

4. In a switch mechanism adapted to be mounted at the lower end of the steering column of an automotive vehicle, a mounting bracket for supporting the switch mechanism from the lower end of the steering column, a substantially cup shaped casing enclosing the switch mechanism and mounted from the bracket co-axially with the steering column, a terminal head closing the casing, stationary contacts carried by the terminal head within the casing, terminal members on the exterior of the terminal head and electrically connected with the stationary contacts, means for attaching conductor wires to the terminal members, said means being disposed side by side at the upper portion of the casing to facilitate attachment and removal of conductor wires therefrom, an enclosing housing carried by the bracket and having an open top adjacent the means for attaching conductor wires to the terminal members, and a cover for the housing adapted when in open position to expose said terminal members and means for attaching conductor wires thereto through the top of the housing.

5. In combination with a switch mechanism adapted to be mounted at the lower end of the steering column of an automotive vehicle, a bracket carried by the lower end of the steering column, a substantially cup shaped casing enclosing the switch mechanism and mounted from the bracket co-axially with the steering column, a terminal head carried by the casing and closing the same, stationary contacts on said terminal head within the casing, terminal members on the exterior of the terminal head and electrically connected with the stationary contacts, means for attaching conductor wires to the terminal members, said means for all of the terminal members being disposed side by side at the upper portion of the casing to facilitate attachment and removal of conductor wires therefrom, a protecting housing carried by the bracket and enclosing the switch mechanism, said protecting housing having a fixed wall projecting above the bracket adjacent the means for attaching conductor wires to the terminal members and being apertured to permit the passage of conductor wires to its interior for connection with the terminal members, a conductor clamp carried by the housing in register with said aperture to clamp conductors passing into the housing and relieve the terminal members of strain, and a cover carried by the protecting housing and movable to expose the ends of the conductors and the means for attaching the same to the terminal members.

In testimony whereof I hereunto affix my signature.

EDWARD N. JACOBI.